(12) United States Patent
Trone et al.

(10) Patent No.: US 11,208,164 B2
(45) Date of Patent: Dec. 28, 2021

(54) SPALLING RESISTANT TRACK LINK AND ROLLER INTERFACE

(71) Applicant: Caterpillar Inc., Deerfield, IL (US)

(72) Inventors: Matthew William Trone, Pekin, IL (US); Jianjun Wang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 589 days.

(21) Appl. No.: 16/153,014

(22) Filed: Oct. 5, 2018

(65) Prior Publication Data

US 2020/0108879 A1   Apr. 9, 2020

(51) Int. Cl.
*B62D 55/20* (2006.01)
*B62D 55/14* (2006.01)
*B62D 55/21* (2006.01)

(52) U.S. Cl.
CPC .......... *B62D 55/202* (2013.01); *B62D 55/14* (2013.01); *B62D 55/21* (2013.01)

(58) Field of Classification Search
CPC ....... B62D 55/202; B62D 55/14; B62D 55/21
See application file for complete search history.

(56) References Cited

U.S. PATENT DOCUMENTS

| | | |
|---|---|---|
| 5,358,064 A | 10/1994 | Oertley |
| 5,704,697 A | 1/1998 | Ketting et al. |
| 5,752,574 A | 5/1998 | Oertley |
| 9,376,149 B2 | 6/2016 | Hakes et al. |
| 9,409,613 B2 | 8/2016 | Hakes |
| 9,688,325 B2 | 6/2017 | Hakes et al. |
| 2016/0137239 A1 | 5/2016 | Steiner et al. |
| 2018/0057082 A1 | 3/2018 | Johannsen |

FOREIGN PATENT DOCUMENTS

| | | |
|---|---|---|
| DE | 4230389 A1 | 4/1993 |
| JP | 2001146182 A | 5/2001 |
| WO | 2015183422 A1 | 12/2015 |

*Primary Examiner* — Jason R Bellinger
(74) *Attorney, Agent, or Firm* — Law Office of Kurt J. Fugman LLC

(57) ABSTRACT

A track link rail surface and roller interface includes a first roller including a cylindrical configuration defining a radial direction, a longitudinal axis, a circumferential direction, and a plane containing the radial direction and the longitudinal axis. The first roller includes a first track link rail engaging surface including a first concave arcuate surface defining a first concave radius of curvature. The interface includes a first track link including a first track link rail surface including a first convex arcuate surface defining a first convex radius of curvature that is less or equal to the first concave radius of curvature.

16 Claims, 7 Drawing Sheets

SPALLING RESISTANT TRACK LINK AND ROLLER INTERFACE

TECHNICAL FIELD

The present disclosure relates to track link and roller interface present in the undercarriage of track driven vehicles and the like. Specifically, the present disclosure relates to a spalling resistant track link and roller interface of track driven machines such as those used in the earth moving, construction, and mining industries and the like.

BACKGROUND

Machines, such as those used in the earth moving, construction, and mining industries use track chain assemblies having various components such as track links, track pins, and track bushings, etc. that rotate relative to each other as the track chain assembly moves about the undercarriage of a track driven machine to propel movement of the machine. The track links include rail surfaces that contact support rollers and the like and the weight of the machine, payload, etc. is transferred from the rollers to the track chain assembly both as the track chain moves and is immobile.

Over time, track links may experience spalling at the lateral edges of the track link rail surface due to high contact stress. This may require that the track chain assembly be replaced or repaired, resulting in increased operating costs or lost profits for an economic endeavor using such machines.

Various prior art solutions have been developed using various profiles for rollers and track link rail surfaces. However, further improvement to reduce the effects of spalling is warranted.

U.S. Pat. Nos. 5,358,064 and 5,752,574 to Oertley disclose track link rail surface and roller interfaces that are specially contoured. However, these designs are not directed to reducing spalling but are instead directed to an undercarriage structure for a track-type machine that has first and second spaced apart roller frame assemblies which are connected to the machine by one or more pivot shafts and an equalizer bar. The first and second roller frame assemblies are so arranged with respect to the pivot shaft and the equalizer bar that the roller frame assemblies are substantially non-parallel to each other. This non-parallelism produces either "toe-out" or "toe-in" of the roller frame assemblies, which results in the endless track contacting the track rollers in different areas as the vehicle travels in forward and then reverse directions. The wear life of the endless track is thereby prolonged.

Accordingly, a track link rail surface and roller interface that reduces spalling is still needed.

SUMMARY

A track link rail surface and roller interface according to an embodiment of the present disclosure comprises a roller including a cylindrical configuration defining a radial direction, a longitudinal axis, and a plane containing the radial direction and the longitudinal axis. The roller also includes a track link rail engaging surface including a concave arcuate surface defining a concave radius of curvature in the plane containing the radial direction and the longitudinal axis. The interface may further comprise a track link including a track link rail surface including a convex arcuate surface defining a convex radius of curvature in the plane containing the radial direction and the longitudinal axis. The roller and the track link may contact each other only along the interface of the convex arcuate surface and the concave arcuate surface.

A track link rail surface and roller interface according to another embodiment of the present disclosure comprises a roller including a cylindrical configuration defining a radial direction, a longitudinal axis, and a plane containing the radial direction and the longitudinal axis. The roller may also include a track link rail engaging surface including a concave arcuate surface defining a concave radius of curvature in the plane containing the radial direction and the longitudinal axis. The interface may also comprise a track link including a track link rail surface including a convex arcuate surface defining a convex radius of curvature in the plane containing the radial direction and the longitudinal axis. A ratio of the concave radius of curvature to the convex radius of curvature may range from 1.0 to 1.6.

A track link rail surface and roller interface according to yet another embodiment of the present disclosure comprises a first roller including a cylindrical configuration defining a radial direction, a longitudinal axis, a circumferential direction, and a plane containing the radial direction and the longitudinal axis. The first roller may also include a first track link rail engaging surface including a first concave arcuate surface defining a first concave radius of curvature in the plane containing the radial direction and the longitudinal axis, and a first track link including a first track link rail surface including a first convex arcuate surface defining a first convex radius of curvature in the plane containing the radial direction and the longitudinal axis. The first convex radius of curvature may be less than or equal to the first concave radius of curvature.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
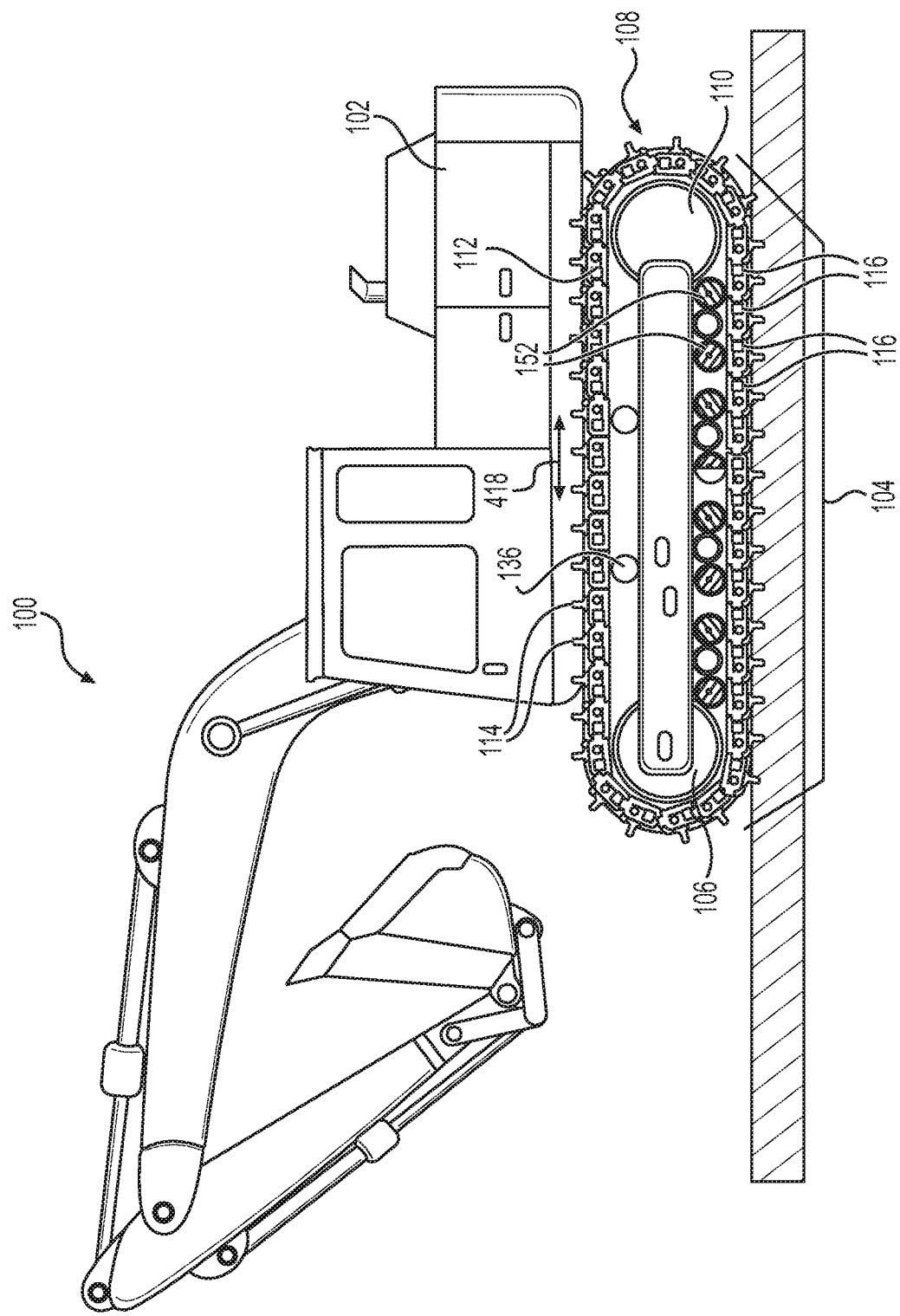
FIG. 1 is a perspective view of a track-type machine which includes a track link rail surface and roller interface according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a track link rail surface and roller interface of the present disclosure will now be discussed. The track chain assemblies and rollers may be used on various track-driven machines as will now be described.

FIG. 1 illustrates an exemplary machine 100 having multiple systems and components that cooperate to accomplish a task. Machine 100 may embody a mobile machine that performs some type of operation associated with an industry such as mining, construction, farming, earth moving, transportation, or any other industry known in the art. For example, machine 100 may be an earth moving machine such as an excavator, a dozer, a loader, a backhoe, a motor grader, or any other earth moving machine. Machine 100 may include a power source 102 and an undercarriage assembly 104, which may be driven by power source 102 and supported by one or more spaced-apart idler wheels 106.

Power source 102 may drive undercarriage assembly 104 of machine 100 at a range of output speeds and torques. Power source 102 may be an engine such as, for example, a diesel engine, a gasoline engine, a gaseous fuel-powered engine, or any other suitable engine. Power source 102 may also be a non-combustion source of power such as, for example, a fuel cell, a power storage device, or any other source of power known in the art.

Undercarriage assembly 104 may include two separate continuous tracks 108, one on either side of machine 100 (only one of which is shown in FIG. 1). Each track 108 may be driven by power source 102 via one or more drive sprockets 110. In addition, each track 108 may include a track chain assembly 112 and a plurality of track shoes 114, each configured to selectively engage a surface, e.g., the ground. Each chain 112 may include a plurality of link subassemblies 116. Support rollers 152 are also provided at the bottom of the track to support the chain.

Figure 2:
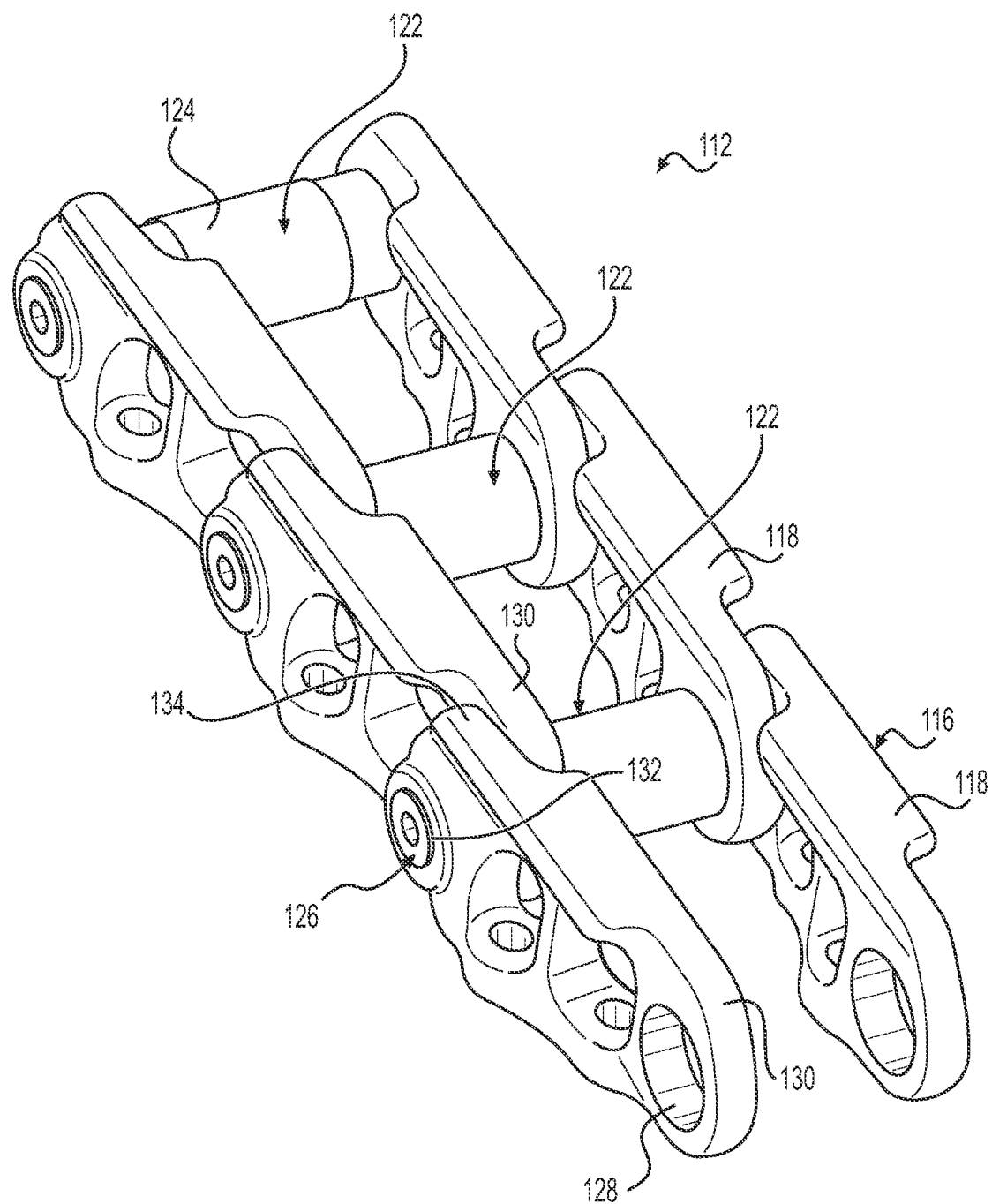
FIG. 2 is a perspective view of a portion of the track chain having a track link rail surface according to an embodiment of FIG. 1.
Figure 3:
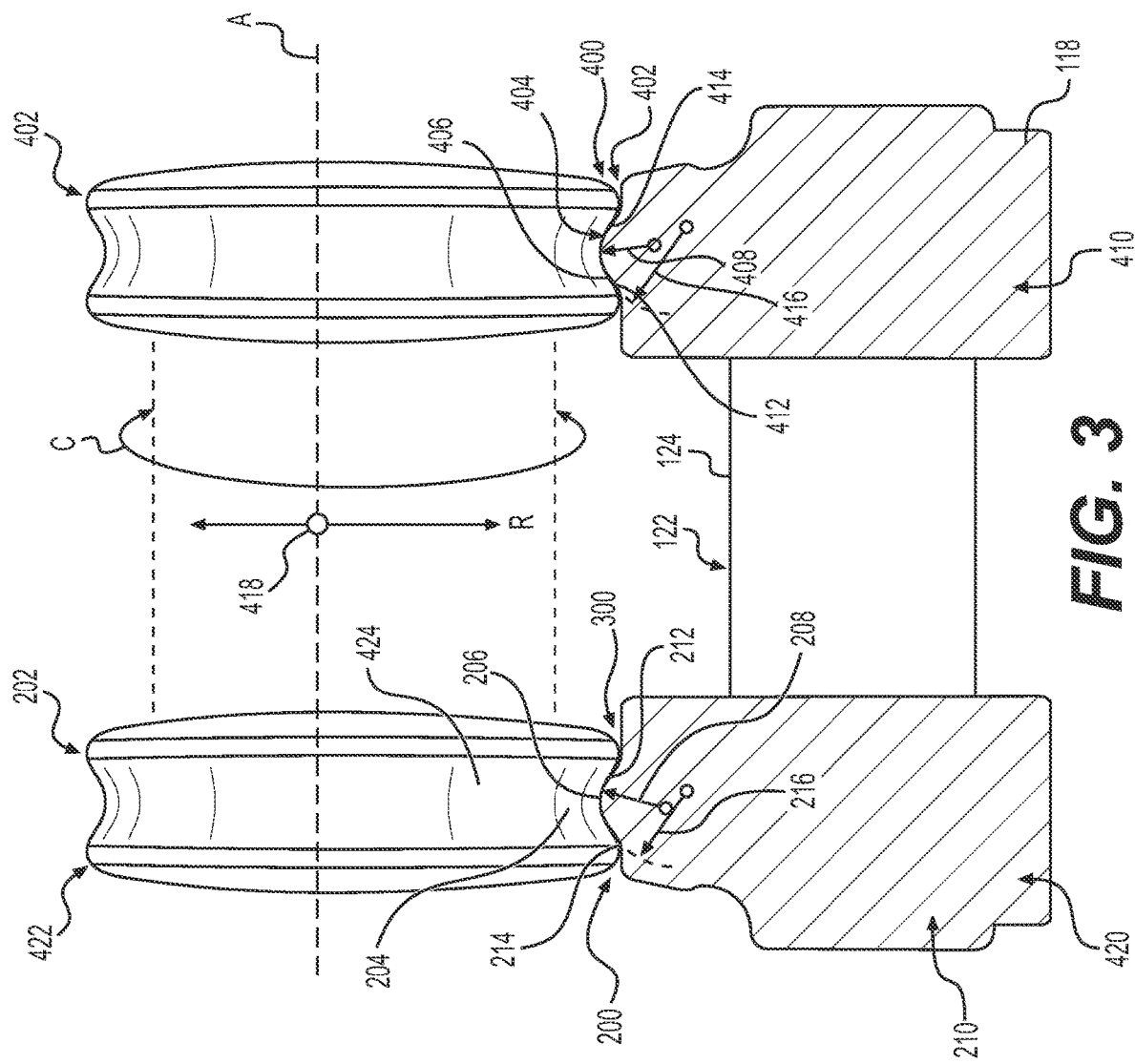
FIG. 3 is a cross-sectional view of the track chain of FIG. 2, showing the track link surface and roller interface according to an embodiment of the present disclosure more clearly.

FIGS. 2 and 3 respectively illustrate a perspective view and cross-sectional views of an exemplary chain assembly 112, and, specifically, a plurality of exemplary link subassemblies 116 and roller(s) utilizing various embodiments of a track links according to the principles of the present disclosure. Each one of link subassemblies 116 may include a respective pair of offset link members 118 or a respective pair of inner and outer links when straight links are used (not shown).

Adjacent ones of link subassemblies 116 may be interconnected by way of rod assemblies 122 in the form of pins and/or bushings. More specifically, each rod assembly 122 may include a substantially cylindrical bushing 124 disposed about a substantially cylindrical pin 126.

As best understood by looking at FIG. 2, the bushing 124 may be pressed into an aperture 128 of one end 130 of the offset link member 118 and the pin 126 may extend through this end 130 of the offset link member 118 and be received in the aperture 132, 132' of other end 134 of the adjacent offset link member 118. The pin 126 may be retained in the other end 134 of the adjacent offset link member 118 by being pressed into that link member 118 or be retained therein using a cotter pin or another similar device when a slip fit is being used. Other configurations and methods of assembling the link subassemblies 116 may be provided to create a track chain assembly 112. Of course, a plurality of offset link members 118 are connected in a manner similar to what has just been described to form the track chain assembly 112, 112'.

More particularly, the first and second rod assemblies 122 may interface with apertures 128, 132 of adjacent offset link members 118, such that consecutively connected link subassemblies 116 may be pivotally interconnected to one another to form the track chain assembly 112. For example, the outer end 134, 134' of one offset link member 118, may mate in fixed manner with the pin 126 (such as when a press fit is employed) and house the seals and/or bearings assemblies while the inner end 130 of the adjacent offset link member 118 may mate with the bushing 124 in a fixed manner (such as when a press fit if employed).

In other embodiments, the bushing 124' may be free to rotate. In either case, the pin 126 may be free to rotate within the bushing 124 such as when some clearance is provided between the pin and the bore of the bushing. Consequently, a pair of adjacent offset link members 118 may be configured to pivot with respect to one another to form an articulating track chain assembly 112.

Referring now to FIG. 3, a track link rail surface and roller interface 200 according to an embodiment of the present disclosure will now be described. The interface 200 may comprise a roller 202 including a cylindrical configuration defining a radial direction R, a longitudinal axis A, and a plane containing the radial direction R and the longitudinal axis A (i.e. the sectioned plane of FIG. 3). The roller 202 also includes a track link rail engaging surface 204 including a concave arcuate surface 206 defining a concave radius of curvature 208 in the plane containing the radial direction R and the longitudinal axis A. As used herein, the term "roller" is to be interpreted broadly and may include support rollers 152, idler wheel 106, drive sprocket 110, carrier rollers 136, etc. as shown in FIG. 1 depending on the embodiment.

The interface 200 may further comprise a track link 210 including a track link rail surface 212 including a convex arcuate surface 214 defining a convex radius of curvature 216 in the plane containing the radial direction R and the longitudinal axis A (i.e. the sectioned plane of FIG. 3). In some embodiments, the roller 202 and the track link 210 contact each other only along the interface of the convex arcuate surface 214 and the concave arcuate surface 206.

Figure 4:
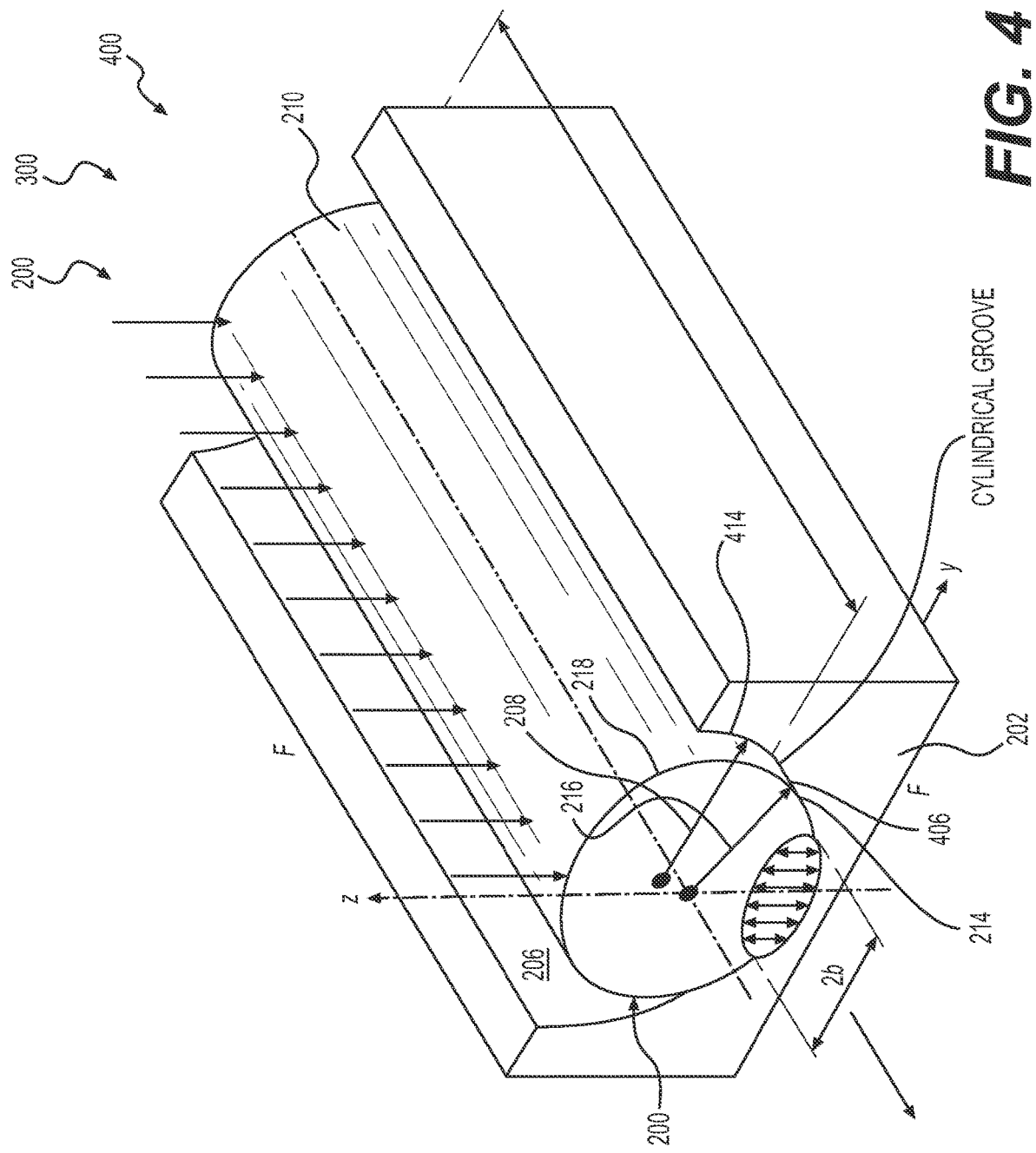
FIG. 4 is a perspective of theoretical roller and track link rail surface geometry that may reduce spalling according to an embodiment of the present disclosure.
Figure 9:
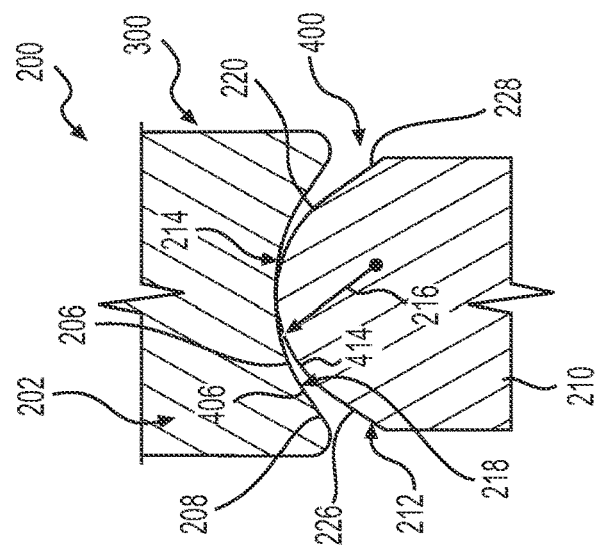
FIG. 9 is an enlarged detail view of a track link rail surface and roller interface according to yet another embodiment of the present disclosure.

In certain embodiments, such as shown in FIGS. 4 and 9, the concave arcuate surface 206 may be a first radial surface 218 (i.e. circular) and the convex arcuate surface 214 may be a second radial surface 220 (i.e. also circular). In some embodiments such as shown in FIG. 4, the concave radius of curvature 208 at least partially matches the convex radius of curvature 216. That is to say, the radii of curvature 208, 216 may have different angular extents but may have the same radius.

Figure 7:
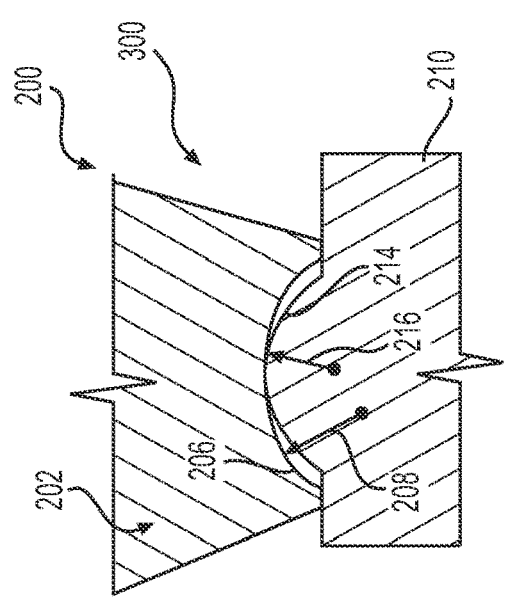
FIG. 7 is an enlarged detail view of a track link rail surface and roller interface according to an embodiment of the present disclosure.

In yet other embodiments such as shown in FIGS. 7 and 9, the concave radius of curvature 208 exceeds the convex radius of curvature 216.

In general, the concave radius of curvature 208 may range from 50 mm to 80 mm and the convex radius of curvature 216 may range from 50 mm to 80 mm in some embodiments. Moreover, the ratio of the concave radius of curvature 208 to the convex radius of curvature 216 may range from 1.0 to 1.6 in some embodiments. These dimensions and ratios may be varied as needed or desired in other embodiments.

Figure 8:
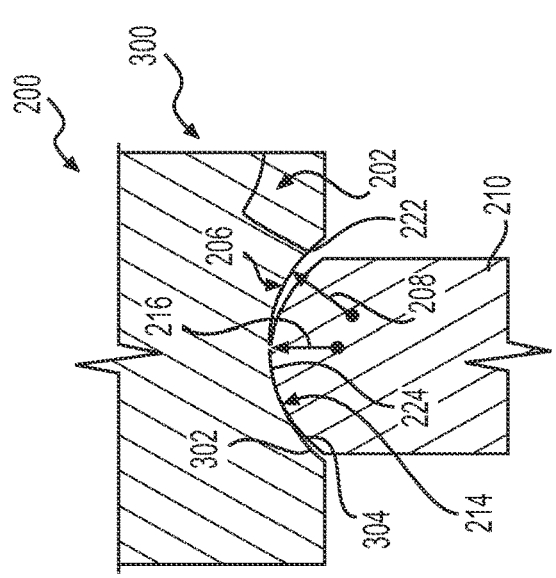
FIG. 8 is an enlarged detail view of a track link rail surface and roller interface according to another embodiment of the present disclosure.

Looking at FIG. 8, the concave arcuate surface 206 may include a first ellipse 222 defining the concave radius of curvature 208 and the convex arcuate surface 214 includes a second ellipse 224 defining the convex radius of curvature 216 that at least partially matches the concave radius of curvature 208.

Referring now to FIG. 9, the track link rail surface 212 may include a first side straight portion 226, and a second side straight portion 228, and the convex arcuate surface 214 may be axially disposed between the first side straight portion 226 and the second side straight portion 228.

Another embodiment of a track link rail surface and roller interface 300 will now be discussed with reference to FIGS. 3, 4, 7, 8 and 9. This interface 300 may comprise a roller 202 including a cylindrical configuration defining a radial direction R, a longitudinal axis A, and a plane containing the radial direction R and the longitudinal axis A. The roller 202 also includes a track link rail engaging surface 204 including a concave arcuate surface 206 defining a concave radius of curvature 208 in the plane containing the radial direction R and the longitudinal axis A as previously described.

This interface 300 may further comprise a track link 210 including a track link rail surface 212 including a convex arcuate surface 214 defining a convex radius of curvature 216 in the plane containing the radial direction R and the longitudinal axis A. The concave radius of curvature 208 ranges from 50 mm to 80 mm and the convex radius of curvature 216 ranges from 50 mm to 80 mm as well. Usually, the concave radius of curvature 208 is greater than or equal to the convex radius of curvature 216. Other dimensions and ratios are possible.

As best seen in FIGS. 4, 8 and 9, the roller 202 and the track link 210 contact each other only along the interface of the convex arcuate surface 214 and the concave arcuate surface 206. In other embodiments, such as indicated by FIGS. 3 and 7, the track link 210 and the roller 202 may contact each other in other places in addition to the arcuate surfaces 206, 214. In such a case, the arcuate surfaces 206, 214 may first contact each other until a load is applied to the interface 300, causing the roller 202 and the track link 210 to deform until contact is made in other places. This may not be the case in other embodiments.

As alluded to earlier herein with reference to FIGS. 4 and 9, the concave arcuate surface 206 may be a first radial surface 218 and the convex arcuate surface may be a second radial surface 220. The concave radius of curvature 208 at least partially matches the convex radius of curvature 216 in FIG. 4. The concave radius of curvature 208 exceeds the convex radius of curvature 216 in some embodiments such as those shown in FIGS. 7 thru 9.

Focusing on FIG. 7, the concave arcuate surface 206 may include a first spline 302 (e.g. a polynomial) defining the concave radius of curvature 208 and the convex arcuate surface 214 may include a second spline 304 (e.g. a polynomial) defining the convex radius of curvature 216 that at least partially matches the concave radius of curvature 208.

Referring to FIG. 3, a track link rail surface and roller interface 400 according to another embodiment of the present disclosure may be described as follows. The interface 400 may comprise a first roller 402 including a cylindrical configuration defining a radial direction R, a longitudinal axis A, a circumferential direction C, and a plane containing the radial direction R and the longitudinal axis A (i.e. the sectioned plane of FIG. 3). The first roller 402 may also include a first track link rail engaging surface 404 including a first concave arcuate surface 406 defining a first concave radius of curvature 408 in the plane containing the radial direction R and the longitudinal axis A.

The interface 400 may further comprise a first track link 410 including a first track link rail surface 412 including a first convex arcuate surface 414 defining a first convex radius of curvature 416 in the plane containing the radial direction R and the longitudinal axis A. The first convex radius of curvature 416 may match the first concave radius of curvature 408. In such embodiments, the first convex radius of curvature 416 may range from 50 mm to 80 mm. Other dimensions are possible.

With reference to FIGS. 4 and 9, the first concave arcuate surface 406 includes a first radial surface 218 and the first convex arcuate surface 414 includes a second radial surface 220.

Looking at FIGS. 1 and 3, the first concave arcuate surface 406 extends along the circumferential direction C in a consistent manner. Also, the first track link 410 defines a track chain traveling direction 418 and the first convex arcuate surface 414 extends along the track chain traveling direction 418 in a consistent manner.

Focusing on FIG. 3, the interface 400 may comprise a second track link 420 identically configured to the first track link 410 and a second roller 422 identically configured to the first roller 402.

In other embodiments, the interface 400 may comprise a second track link 420 identically configured to the first track link 410 and the first roller 402 includes a second concave arcuate surface 424 identically configured to the first concave arcuate surface 406 (i.e. the roller may be wide enough to engage both track links on either side of the track chain assembly).

The track links and the roller(s) may be made from any suitable material including steel, iron, etc.

Any of the dimensions, configurations, etc. discussed herein may be varied as needed or desired to be different than any value or characteristic specifically mentioned herein or shown in the drawings for any of the embodiments.

Industrial Applicability

In practice, roller, a track chain assembly, or a machine using any embodiment disclosed herein may be sold, bought, manufactured or otherwise obtained in an OEM (original equipment manufacturer) or after-market context. In particular, roller and/or the track chain assembly may be used with existing machines.

Figure 5:
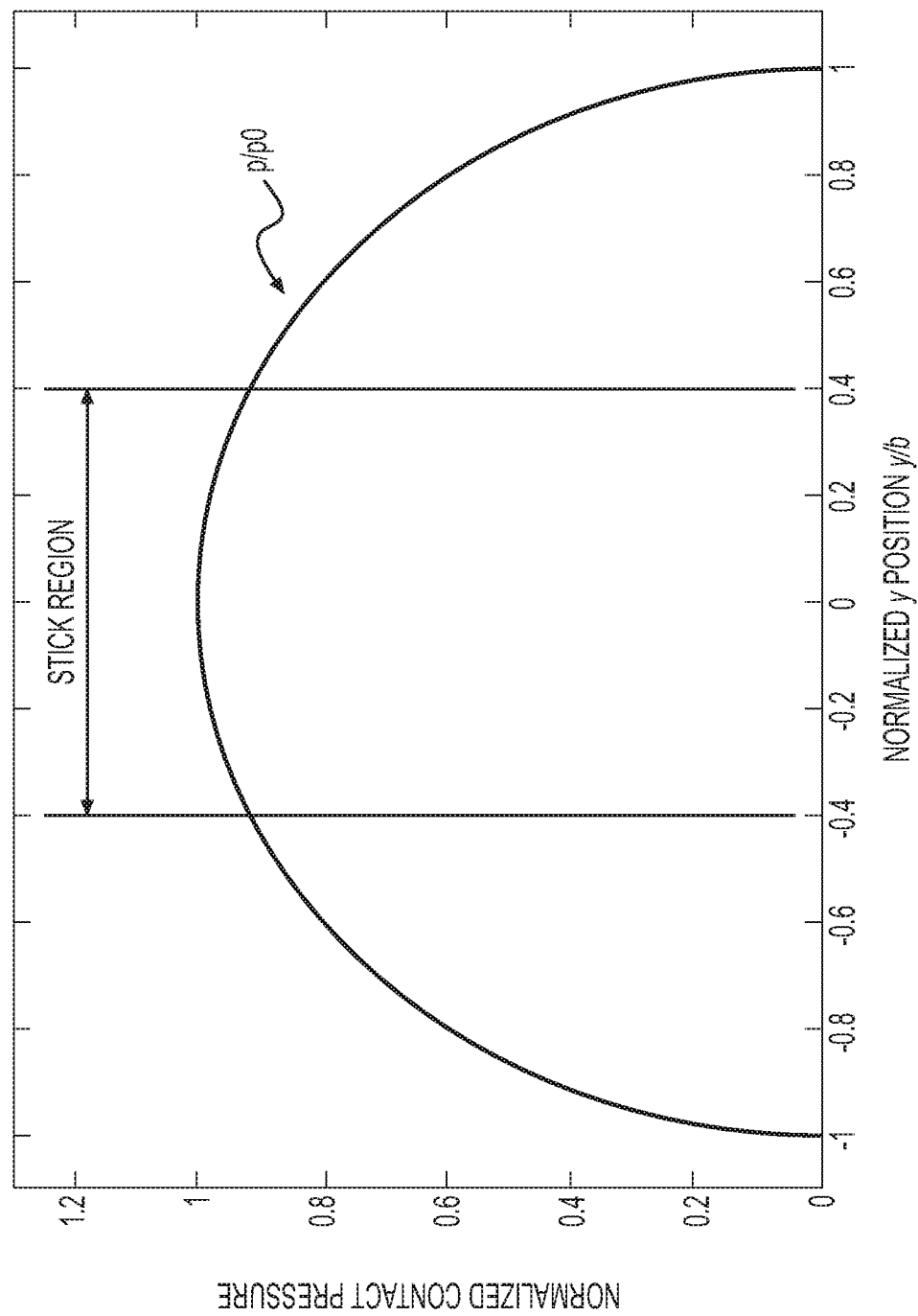
FIG. 5 is a plot the normalized contact pressure versus the normalized position along the Y-axis of the model shown in FIG. 4.
Figure 6:
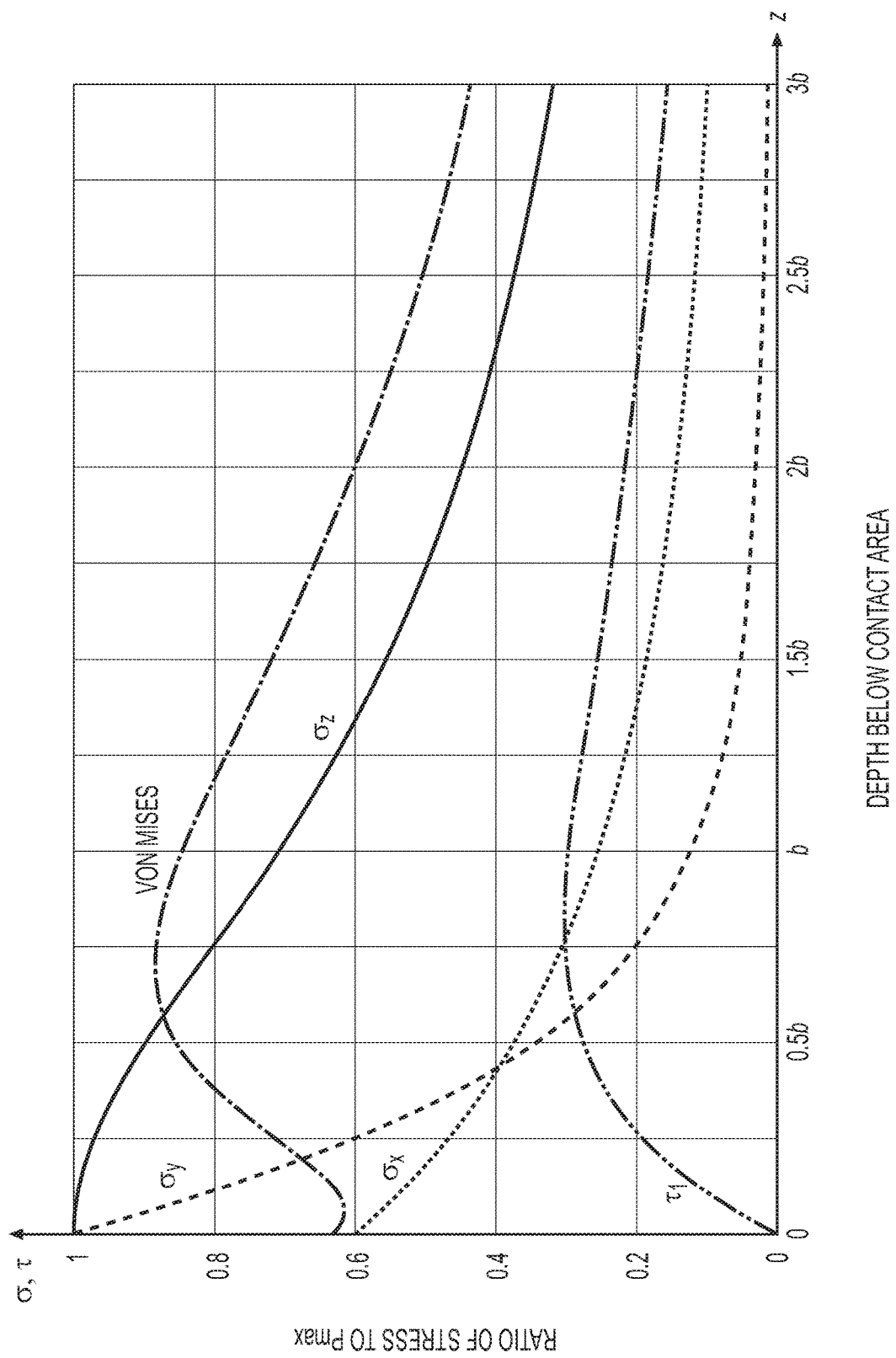
FIG. 6 is another plot showing the various types of stresses associated with the model shown in FIG. 4.

Embodiments of a track link rail surface and roller interface such as the one disclosed in FIG. 4 may reduce the risk of spalling. For example, FIG. 5 illustrates that the risk or spalling near the edges of the track link rail surface may be significantly reduced since the normalized contact pressure at the edges approaches zero, instead of infinity for many current track link rail surface and roller interfaces. FIG. 6 illustrates that the stresses are reduced as one progresses along the depth of the interface. Therefore, FIG. 5 and FIG. 6 support the conclusion that one skilled in the art would expect that using a track link with a convex rail surface that mates with a roller having a concave surface would reduce the risk of spalling.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track link rail surface and roller interface comprising:
a roller including
a cylindrical configuration defining a radial direction, a longitudinal axis, and a plane containing the radial direction and the longitudinal axis,
the roller also including a track link rail engaging surface including a concave arcuate surface defining a concave radius of curvature in the plane containing the radial direction and the longitudinal axis; and
a track link including
a track link rail surface including a convex arcuate surface defining a convex radius of curvature in the plane containing the radial direction and the longitudinal axis;
wherein the roller and the track link contact each other along the interface of the convex arcuate surface and the concave arcuate surface, and the track link rail surface includes a first side straight portion, and a second side straight portion, and the convex arcuate surface is axially disposed between the first side straight portion and the second side straight portion.

2. The track link rail surface and roller interface of claim 1 wherein the concave arcuate surface is a first radial surface and the convex arcuate surface is a second radial surface.

3. The track link rail surface and roller interface of claim 2 wherein the concave radius of curvature at least partially matches the convex radius of curvature.

4. The track link rail surface and roller interface of claim 3 wherein the concave radius of curvature exceeds the convex radius of curvature.

5. The track link rail surface and roller interface of claim 1 wherein the concave radius of curvature ranges from 50 mm to 80 mm and the convex radius of curvature ranges from 50 mm to 80 mm.

6. The track link rail surface and roller interface of claim 1 wherein the concave arcuate surface includes a first ellipse defining the concave radius of curvature and the convex arcuate surface includes a second ellipse defining the convex radius of curvature that at least partially matches the concave radius of curvature.

7. A track link rail surface and roller interface comprising:
a roller including
a cylindrical configuration defining a radial direction, a longitudinal axis, and a plane containing the radial direction and the longitudinal axis,
the roller also including a track link rail engaging surface including a concave arcuate surface defining a concave radius of curvature in the plane containing the radial direction and the longitudinal axis; and
a track link including
a track link rail surface including a convex arcuate surface defining a convex radius of curvature in the plane containing the radial direction and the longitudinal axis;
wherein a ratio of the concave radius of curvature to the convex radius of curvature ranges from 1.0 to 1.6, and the concave arcuate surface includes a first spline defining the concave radius of curvature and the convex arcuate surface includes a second spline defining the convex radius of curvature that at least partially matching the concave radius of curvature.

8. The track link rail surface and roller interface of claim 7 wherein the roller and the track link contact each other only along the interface of the convex arcuate surface and the concave arcuate surface.

9. The track link rail surface and roller interface of claim 8 wherein the concave arcuate surface is a first radial surface and the convex arcuate surface is a second radial surface.

10. The track link rail surface and roller interface of claim 9 wherein the concave radius of curvature at least partially matches the convex radius of curvature.

11. The track link rail surface and roller interface of claim 9 wherein the concave radius of curvature exceeds the convex radius of curvature.

12. A track link rail surface and roller interface comprising:
a first roller including
a cylindrical configuration defining a radial direction, a longitudinal axis, a circumferential direction, and a plane containing the radial direction and the longitudinal axis,
the first roller also including a first track link rail engaging surface including a first concave arcuate surface defining a first concave radius of curvature in the plane containing the radial direction and the longitudinal axis; and
a first track link including
a first track link rail surface including a first convex arcuate surface defining a first convex radius of curvature in the plane containing the radial direction and the longitudinal axis;
wherein the first convex radius of curvature is less than or equal to the first concave radius of curvature, and the first concave arcuate surface includes a first spline defining the first concave radius of curvature and the convex arcuate surface includes a second spline defining the first convex radius of curvature that at least partially matching the first concave radius of curvature.

13. The track link rail surface and roller interface of claim 12 wherein the first convex radius of curvature ranges from 50 mm to 80 mm.

14. The track link rail surface and roller interface of claim 12 wherein the first concave arcuate surface includes a first radial surface and the first convex arcuate surface includes a second radial surface.

15. The track link rail surface and roller interface of claim 12 wherein the first concave arcuate surface extends along the circumferential direction in a consistent manner.

16. The track link rail surface and roller interface of claim 12 wherein the first track link defines a track chain traveling direction and the first convex arcuate surface extends along the track chain traveling direction in a consistent manner.

\* \* \* \* \*